(12) United States Patent
Ward et al.

(10) Patent No.: US 10,394,455 B2
(45) Date of Patent: *Aug. 27, 2019

(54) DETERMINING TRACKS TO RELEASE IN A TARGET VOLUME MIRRORED FROM A SOURCE VOLUME

(71) Applicant: INTERNATIONAL BUSINESS MACHINES CORPORATION, Armonk, NY (US)

(72) Inventors: Matthew J. Ward, Vail, AZ (US); Joshua J. Crawford, Tucson, AZ (US); Gregory E. McBride, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,375

(22) Filed: Dec. 13, 2017

(65) Prior Publication Data

US 2019/0179539 A1 Jun. 13, 2019

(51) Int. Cl.
*G06F 3/06* (2006.01)

(52) U.S. Cl.
CPC .......... *G06F 3/0608* (2013.01); *G06F 3/065* (2013.01); *G06F 3/067* (2013.01); *G06F 3/0652* (2013.01); *G06F 3/0665* (2013.01)

(58) Field of Classification Search
CPC ...... G06F 3/0619; G06F 3/065; G06F 3/0665; G06F 3/067
See application file for complete search history.

(56) References Cited

U.S. PATENT DOCUMENTS

| 8,959,305 | B1 | 2/2015 | Lecrone et al. | |
| 2014/0006853 | A1* | 1/2014 | Dudgeon | G06F 11/1435 714/15 |
| 2015/0261453 | A1 | 9/2015 | Ash et al. | |
| 2016/0320988 | A1* | 11/2016 | Bish | G06F 3/0619 |
| 2017/0206020 | A1 | 7/2017 | Brown et al. | |
| 2017/0206158 | A1 | 7/2017 | Brown et al. | |

OTHER PUBLICATIONS

B. Dufrasne, et al., "IBM DS8880 Thin Provisioning", International Business Machines Corp., Redpaper, Document No. REDP-5343-00, Aug. 2016, pp. 80.

(Continued)

*Primary Examiner* — Reginald G Bragdon
*Assistant Examiner* — Edward Wang
(74) *Attorney, Agent, or Firm* — David W. Victor; Konrad Raynes Davda & Victor LLP

(57) ABSTRACT

Provided are a computer program product, system, and method for determining tracks to release in a target volume mirroring tracks from a source volume. Tracks received from the source volume are written to the target volume to form a consistency group of tracks in the source volume at the target volume. A determination is made of tracks available to release from a volume table providing a state of the tracks in the target volume and space allocated to the determined tracks is released. A point-in-time copy of the target volume is crated and complete is returned to forming the consistency group in response to releasing the space and creating the point-in-time copy.

21 Claims, 6 Drawing Sheets

(56) References Cited

OTHER PUBLICATIONS

C. Burger, et al., "Accelerate with IBM Storage: DS8880/DS8880F Thin Provisioning", IBM Washington Systems Center—Storage; 2017, pp. 89.
U.S. Appl. No. 15/604,420, filed May 24, 2017.
List of IBM Patents or Patent Applications Treated as Related, dated Dec. 13, 2017, pp. 2.
U.S. Appl. No. 15/840,349, filed Dec. 13, 2017.
U.S. Appl. No. 15/840,363, filed Dec. 13, 2017.
Notice of Allowance dated Mar. 29, 2019, pp. 13, for U.S. Appl. No. 15/840,349.
Notice of Allowance for U.S. Appl. No. 15/840,363, dated May 1, 2019.
U.S. Appl. No. 161430,747, filed Jun. 4, 2019.
U.S. Appl. No. 161430,765, filed Jun. 4, 2019.
U.S. Appl. No. 16/430,777, filed Jun. 4, 2019.
List of IBM Patents or Patent Applications Treated as Related, Jun. 4, 2019, pp. 2.

\* cited by examiner

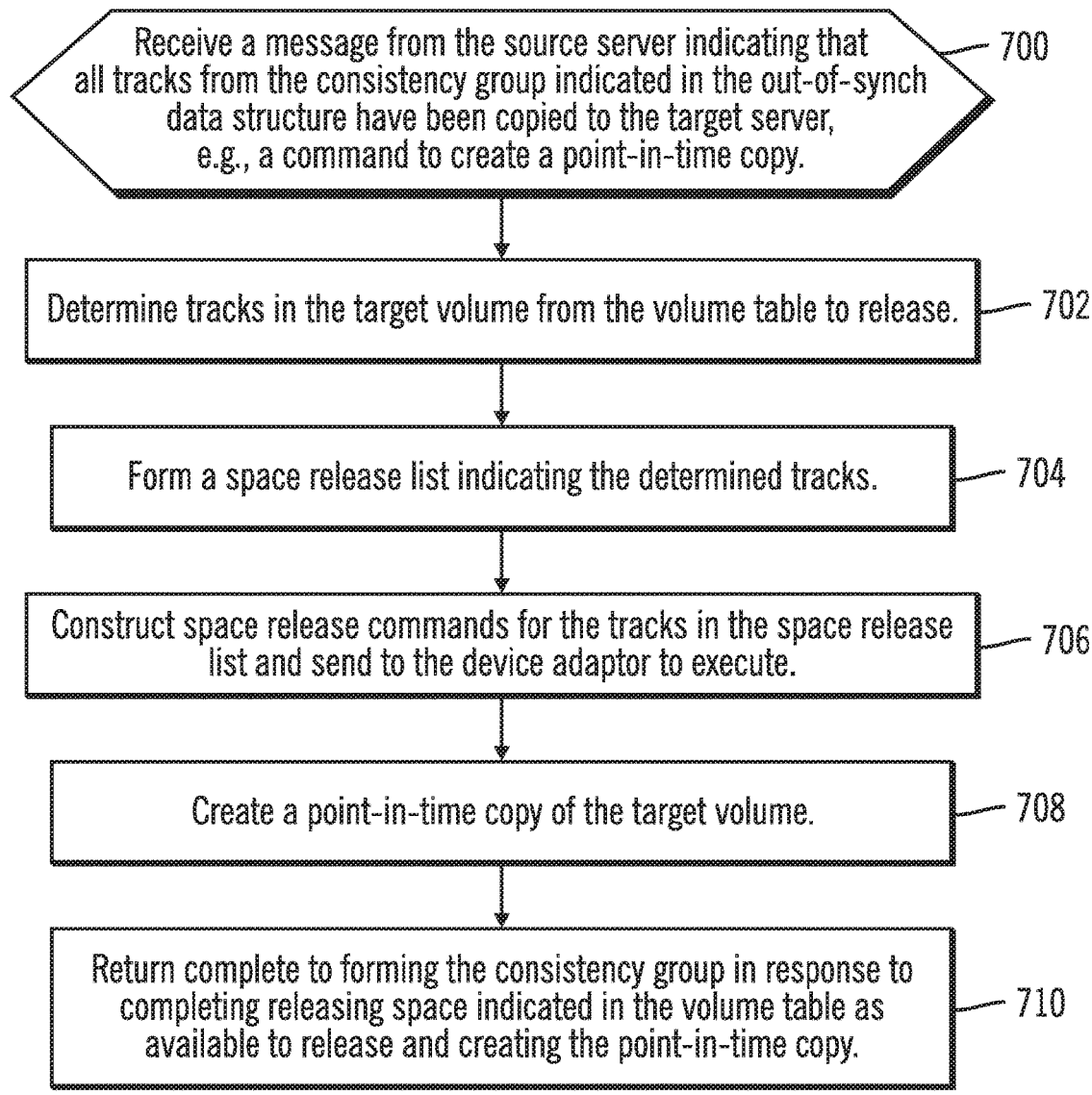

DETERMINING TRACKS TO RELEASE IN A TARGET VOLUME MIRRORED FROM A SOURCE VOLUME

BACKGROUND OF THE INVENTION

1. Field of the Invention

The present invention relates to a computer program product, system, and method for determining tracks to release in a target volume mirroring tracks from a source volume.

2. Description of the Related Art

Storage volumes may be "thin provisioned", meaning that extents of storage space are assigned to the volume but not allocated until needed. Additional extents may be allocated to the volume on an extent boundary at a time when an allocated extent is first written. Extents that are allocated but not being used for a "thin provisioned" volume may be released, i.e., unallocated, and available to assign to other thin provisioned volumes.

The data in a thin provisioned volume may be subject to a mirror copy operation, such as an asynchronous copy operation to a secondary volume. Data may be copied in consistency groups to provide the mirroring of changed data consistent as of a consistency group time. Data in the consistency group may comprise data that has been updated in the primary volume prior to a time of a next consistency group.

In current systems, if a space release command is received to release tracks within a consistency group being mirrored to a secondary volume, then the consistency group copy is cancelled to allow the space release command to complete. A new consistency group may be formed to cause the copying of all data prior to the previous consistency group formed.

Described embodiments provide improved technological solutions to optimize computer technology related to determine space to release for tracks a consistency group in-progress of being formed.

SUMMARY

Provided are a computer program product, system, and method for determining tracks to release in a target volume mirroring tracks from a source volume. Tracks received from the source volume are written to the target volume to form a consistency group of tracks in the source volume at the target volume. A determination is made of tracks available to release from a volume table providing a state of the tracks in the target volume and space allocated to the determined tracks is released. A point-in-time copy of the target volume is crated and complete is returned to forming the consistency group in response to releasing the space and creating the point-in-time copy.

BRIEF DESCRIPTION OF THE DRAWINGS

FIG. 6 illustrates an embodiment of operations to form a consistency group on a target volume.

FIG. 7 illustrates an embodiment of operations to process a message that all the tracks for the consistency group being formed have been sent.

DETAILED DESCRIPTION

In current art, if a space release command is received to release space that is within a consistency group in progress of being formed as part of mirroring data to a target storage system, then the consistency group is canceled to allow the space release command to proceed. Described embodiments provide improvements and optimizations to the computer technology for releasing space at a target volume of a consistency group being formed as part of forming a consistency group in a mirror copying environment. With the described embodiments, after forming a consistency group of tracks in a source volume to copy to a target volume, a determination is made of space for tracks in the target volume to release based on available space indicated in the volume table for the target volume as available to release. After completing the consistency group and releasing available space in the target volume, a point-in-time copy of the target volume is created at the target server. Complete is returned to the source server for the consistency group in response to releasing the space and creating the point-in-time copy. The source server may start forming the next consistency group upon receiving the completion message from the target server.

With the described embodiments, the target server automatically determines to release space after forming the consistency group to automatically release space at the target volume to be available for use in other thin provisioned volume. Since the target server has the current information on the state of the target volume, the target server may more efficiently determine to release space than a host system or operator at the host system.

Figure 1:
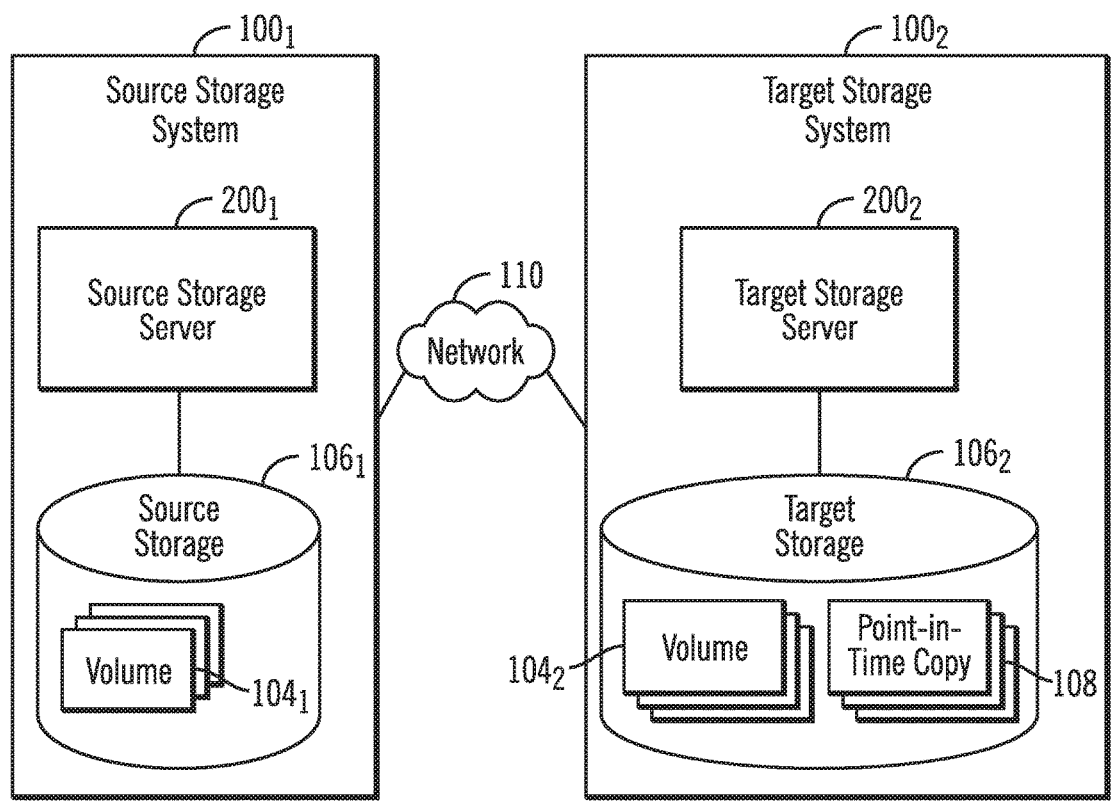
FIG. 1 illustrates an embodiment of a storage environment.

FIG. 1 illustrates an embodiment of a data storage environment having at least two storage systems $100_1$ and $100_2$, each including storage servers $200_1$ and $200_2$, respectively, managing access to volumes $104_1$ and $104_2$ configured in storages $106_1$ and $106_2$. Host systems (not shown) may perform read and write operations with respect to the first storage system $100_1$ over a storage network 110. A source storage $106_1$ may comprise a primary production volume to which hosts direct read and write request. The source server $200_1$ may mirror tracks in the source volumes $104_1$ to the target storage system $100_2$ to maintain data in consistency groups at the target server $200_2$. A track may comprise any data unit type, such as a track, logical block, extent, page, etc.

When formation of the tracks for a consistency group is completed in the target volume $104_2$, the target server $200_2$ may create a point-in-time copy 108 of the target volume $104_2$ for the consistency group. There may be multiple point-in-time copies at different consistency group times for a target volume $104_2$.

The term "storage system" as used herein may refer to a storage server $200_1$, $200_2$ and/or the storage $106_1$, $106_2$ managed by the server.

The storages $106_1$, $106_2$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_1$, $104_2$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$ may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the storage systems $100_1$ and $100_2$ to mirror data may comprise a storage network such as one or more interconnected Local Area Networks (LAN), Storage Area Networks (SAN), Wide Area Network (WAN), peer-to-peer network, wireless network, etc.

A volume $104_1$, $104_2$ may comprise any logical or physical allocation of data, such as a logical volume, logical unit number (LUN), logical device, logical disk, etc. The volumes $104_1$, $104_2$ may comprise thin provisioned volumes, meaning that tracks are only allocated in the storage $106_1$, $106_2$ for a volume when needed to store data. The space release operations described herein release space in the volumes $104_1$, $104_2$ to be available for allocation to other thin provisioned volumes.

Figure 2A:
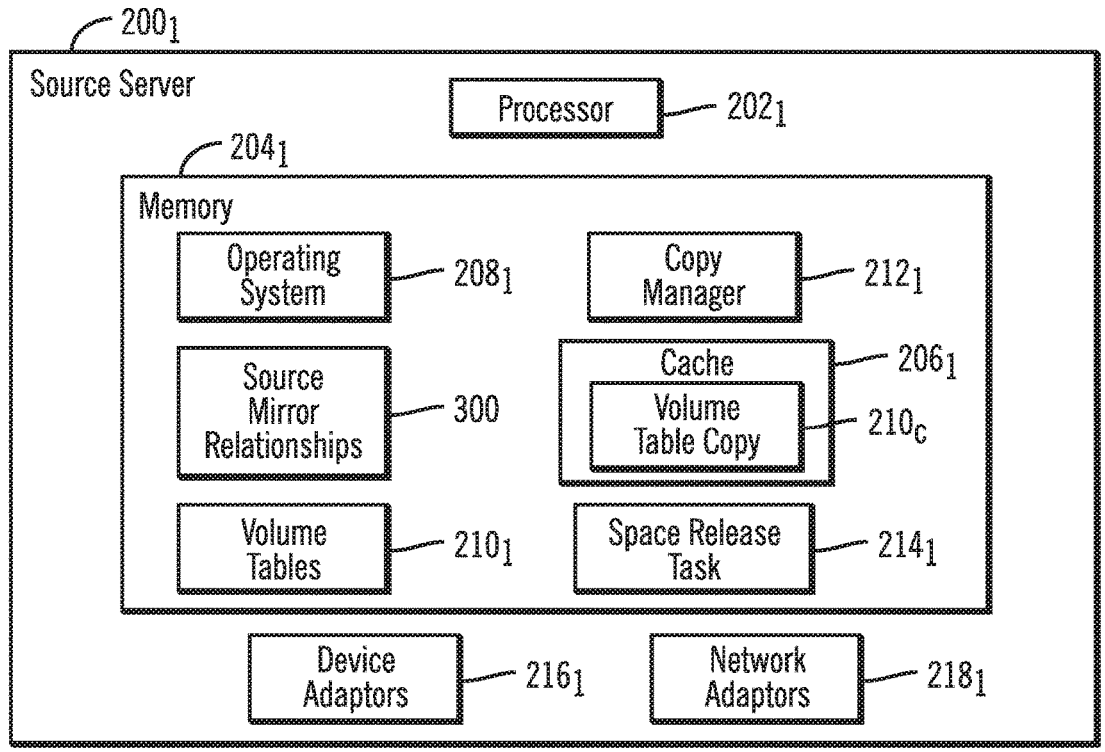
FIG. 2*a* illustrates an embodiment of components in a source server in a storage environment of FIG. 1 from which tracks are mirrored to a target server.

FIG. 2a shows components of the source server $200_1$, as including a processor $202_1$ and a memory $204_1$ including programs executed by the processor $202_1$ as well as a cache $206_1$ to cache read and write data for the source storage $106_1$. The cache $206_1$ may also store data being transferred between the servers $200_1$, $200_2$ as part of mirror copy relationships. The memory $204_1$ includes an operating system $208_1$, which forms volumes $104_1$ and maintains volume tables $210_1$, such as a volume table of contents (VTOC), file allocation table, etc., providing information on the tracks or extents of tracks allocated to the volume $104_1$ and free space in the volume, as well as other metadata. The cache $206_1$ may store a volume table copy $210_C$ comprising a copy of a volume table 210 as of a consistency group time to maintain a state of a volume $104_1$ for a consistency group.

The operating system $208_1$ may manage volumes $104_1$ as thin provisioned volumes and allocate space to the provisioned but unallocated space and a space release task $214_1$ may issue commands to the device adaptors $216_1$ to release space allocated to a thin provisioned volume $104_1$ to make available to assign to other volumes $104_j$.

The memory $204_1$ includes a source copy manager $212_1$ to create and manage mirror relationships 300 to mirror data in volumes $104_1$ in the source storage system $100_1$ to a target volume $104_2$ in the target storage system $100_2$ as part of consistency groups. The operating system $208_1$ may further spawn one or more space release tasks $214_1$ to process the volume table copy $210_C$ to determine space to release for tracks in a volume $104_1$.

The server $200_1$ includes one or more device adaptors $216_1$ to communicate with devices in the source storage $106_1$ and one or more network adaptors $218_1$ to communicate with the network 110 and manage the transfer of data on the network 110.

Figure 2B:
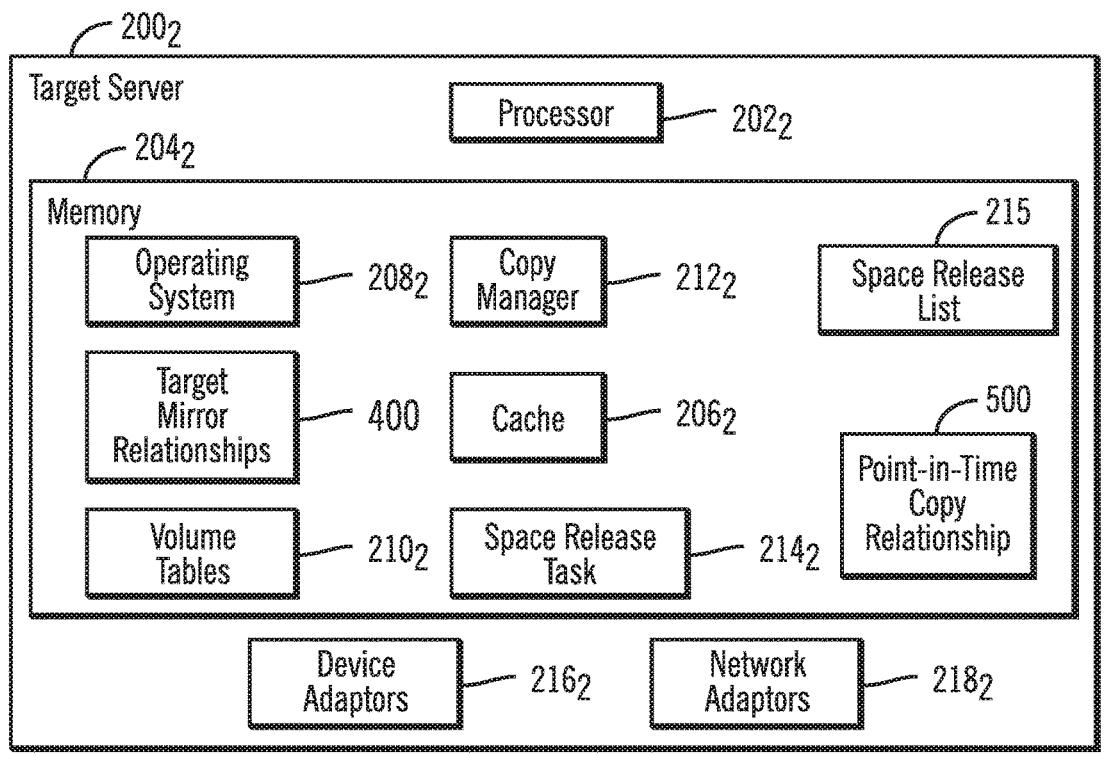
FIG. 2*b* illustrates an embodiment of components in a target server in a storage environment of FIG. 1 to which tracks are mirrored.

FIG. 2b shows components of the target server $200_2$ as including a processor $202_2$ and a memory $204_2$ including programs executed by the processor $202_2$ as well as a cache $206_2$ to cache read and write data for the target volume $104_2$. The cache $206_2$ may also store data being transferred between the servers $200_1$, $200_2$ as part of mirror copy relationships. The memory $204_2$ includes an operating system $208_2$, which forms volumes $104_2$ and maintains volume tables $210_2$, such as a volume table of contents (VTOC), file allocation table, etc., providing information on the tracks or extents of tracks allocated to the volume $104_2$ and free space in the volume, as well as other metadata.

The operating system $208_2$ may manage volumes $104_2$ as thin provisioned volumes and allocate space to the provisioned but unallocated space and a space release task $214_2$ may issue commands to the device adaptors 216 to release space allocated to a thin provisioned volume $104_i$ to make available to assign to other volumes $104_j$.

The memory $204_2$ includes a target copy manager $212_2$ to create and manage target mirror relationships 400 to mirror data in volumes $104_1$ in the source storage system $100_i$ to the target volume $104_2$ in the target storage system $100_2$ as part of consistency groups. The target mirror copy relationship information 400 provides information on source volume $104_1$ tracks copied to store at the target volume $104_2$ of a source-target volume pair. The target copy manager $212_2$ further maintains point-in-time ("PiT") copy relationship information 500 having information on a point-in-time copy of a target volume $104_2$ that may be created after forming a consistency group at the target volume $104_2$.

The operating system $208_2$ may further spawn one or more space release tasks $214_2$ to generate a space release list 215 indicating tracks in the target volume $104_2$ available for space release as indicated by a source volume table 218 sent from the source server $200_1$ indicating a state of the tracks in the source volume $104_1$ as of a consistency group time when the consistency group being formed. There may be multiple source volume tables 218 for multiple source-volume pairs in the consistency group being formed.

The server $200_2$ includes one or more device adaptors $216_2$ to communicate with devices in the target storage $106_2$ and one or more network adaptors $218_2$ to communicate with the network 110 and manage the transfer of data on the network 110.

Figure 3:
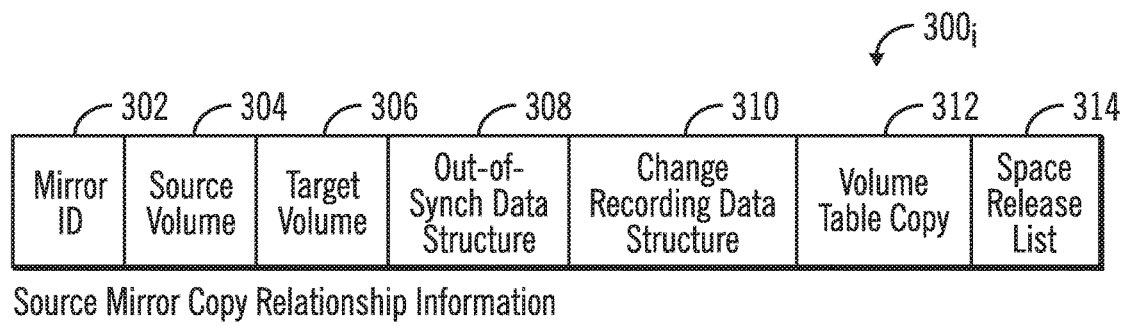
FIG. 3 illustrates an embodiment of source mirror copy relationship information.

FIG. 3 illustrates an embodiment of an instance of a source mirror copy relationship $300_i$ maintained at the source server $200_1$, which may include a mirror copy identifier 302 identifying the mirror copy created by a source copy manager $212_1$; a source volume 304, such as all or part of a source volume $104_1$, from which data is copied; a target volume 306, such as all or part of a target volume $104_2$, to which data is copied from the source volume 304; an out-of-synch data structure 308, such as a bitmap, indicating tracks or other data units in the source volume 304 that have been written, i.e., updated or changed, and need to be copied to the target volume 306; change recording data structure 310, such as a change recording bitmap, indicating source 304 tracks that have been updated or changed to be included in the next consistency group to form; a volume table copy 312 comprising a copy of a volume table 210 at the source sever 200₁, which may be stored in the cache 206₁ at the source sever 200₁, having a state of the tracks in the source volume 304 as of a consistency group time; and a space release list 314 indicating tracks in the source volume 304 to release.

To create a new consistency group, the change recording data structure 310, indicating data written, i.e., updated, while copying written data for the current consistency group being formed, is merged with the out-of-synch data structure 308, which does not indicate tracks to copy after the current consistency group is completed. After the merging, the change recording data structure 310 is cleared to record new updates for a next consistency group while the data indicated as changed in the out-of-synch data structure 308 is being copied to the target volume 306 to form the current consistency group.

Figure 4:
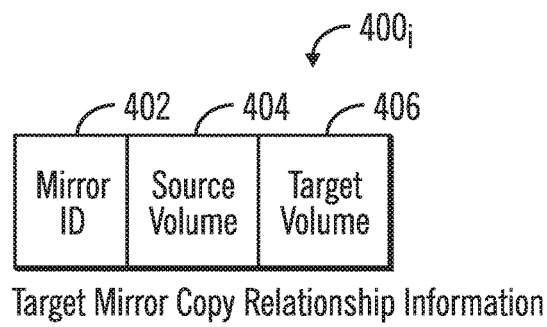
FIG. 4 illustrates an embodiment of target mirror copy relationship information.

FIG. 4 illustrates an embodiment of an instance of a target mirror copy relationship 400₁ maintained at the target server 400₂, which may include a mirror copy identifier 402 identifying the mirror copy created by a source copy manager 412₁; a source volume 404, such as all or part of a source volume 104₁, from which data is copied; and a target volume 406, such as all or part of a target volume 104₂, to which data is copied from the source volume 404.

Figure 5:
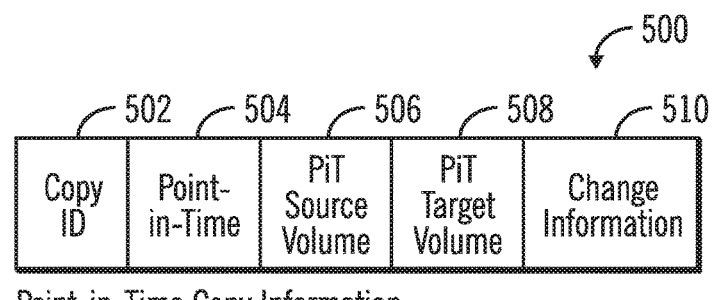
FIG. 5 illustrates an embodiment of point-in-time copy information.

FIG. 5 illustrates an embodiment of point-in-time ("PiT") copy relationship information 500 for a point-in-time copy created of the target volume 104₂ when the source server 200₁ has completed copying all the data indicated in the out-of-synch data structure 308 for the current consistency group being formed. The source server may send a point-in-time copy command to create the point-in-time copy 108, 500 after copying all the tracks for the consistency group. Point-in-time copy information 500 may include a PiT copy identifier 502 identifying the PiT copy 108 created by the target copy manager 212₂; a point-in-time 504 of the PiT copy 500, such that data is consistent as of that point-in-time 504; PiT source volume 506, e.g., target volume 104₂, from which data is copied; PiT target volume 508, e.g., point-in-time copy 108, to which the PiT source volume data is copied; and change information 510 indicating data or tracks in the PiT source volume 506, e.g., target volume 104₂, that needs to be copied to the PiT target volume 508, e.g., 108, such as tracks that have changed since the point-in-time 504 and while the PiT copy 502 was open. The change information 510 may comprise a bitmap having a bit for each data unit (e.g., track) that is set to one of two values indicating the data or track represented by the bit has or has not been updated since the point-in-time 504. The source 506 and target 508 data may comprise a volume, a subset of a volume or other unit of data. When the bit indicates the track has been updated, than that track needs to be copied to the point-in-time copy 108.

The mirror copies 300, 400 and point-in-time copies 500 may be implemented with copy technology known in the art, such as IBM® FlashCopy®, IBM® Metro Mirror@, IBM® Global Mirror@, and mirror and snapshot technology provided from other vendors. (IBM, FlashCopy, Metro Mirror, and Global Mirror are registered trademarks or common law marks throughout the world.

A point-in-time copy 500 replicates data in a manner that appears instantaneous, and any actual data transfers to the copy volume are deferred to a later time when the data in the target volume 104₂ in the point-in-time copy 108 is subject to a write following the creation of the point-in-time copy. The point-in-time copy appears instantaneous because complete is returned to the copy operation in response to generating the data structures 500 without copying the data. Point-in-time copy techniques typically defer the transfer of the data in the target volume 104₂ at the time the point-in-time copy relationship 500 was established to the point-in-time copy 108 until a write operation is requested to that data block on the target volume 104₂ following the point-in-time 504.

FIG. 6 illustrates an embodiment of operations performed by the target copy manager 212₂ to form a consistency group as of a consistency group time at a target volume 104₂ at the target storage 106₂. Upon initiating (at block 600) an operation to form a consistency group at the target volume 104₂, the target copy manager 212₂ receives (at block 602) tracks from the source server 200₁ for the source volume 104₁ and writes the tracks to the target volume 104₂ of a mirror copy relationship 300ᵢ for the consistency group.

FIG. 7 illustrates an embodiment of operations performed by the target copy manager 212₂ to process a message from the source server 200₁ that the consistency group being formed is completed, which may comprise create point-in-time copy command. Upon receiving (at block 600) a message from the source server 200₁ indicating that all tracks from the consistency group indicated in the out-of-synch data structure 308 at the source sever 200₁ have been copied to the target server 200₂, such as may be indicated with a point-in-time copy establish command, the target copy manager 212₂ may spawn (at block 702) a space release task 214 to determine tracks in the target volume 104₂ from the volume table space to release. The space release task 214 may form (at block 704) a space release list 215 indicating tracks for space release and constructs (at block 706) space release commands for the tracks in the space release list 215 to send to the device adaptor 216 to execute to release space in the target volume 406. After releasing the space, the target copy manager 212₂ creates (at block 708) a point-in-time copy 108 of the target volume 104₂ having all the tracks for the consistency group just completed. The target copy manager 212₂ may return (at block 710) complete to the source server 200₁ forming the consistency group in response to completing releasing space indicated in the volume table 210 as available to release and creating the point-in-time copy 108.

With the embodiment of FIGS. 6 and 7, the completion of a consistency group is delayed until the free space is released from the target volume 104₂, so that unused data may be made available for other volumes in a thin provisioned environment. Further, with described embodiments, the space relations happen automatically at the copy manager of the target server using the most relevant and current information for the target volume maintained at the target server.

With the embodiment of operations in FIGS. 6 and 7, the space release operations for the target volume 104₂ are performed at the target server 200₂ after the consistency group is formed at the target volume, which is signaled by the source server 200₁ sending the create point-in-time command. In this embodiment, the space release operations may not interfere with the copying of the source tracks and is performed after the consistency group is formed so that space is released before returning complete to the source server 200₁. In an alternative embodiment, the space release operations at blocks 702, 704, 706 of FIG. 7 may be performed while the consistency group is being formed, such as while tracks from the source volume 104₁ are being copied to the target volume 104₂.

Figure 8:
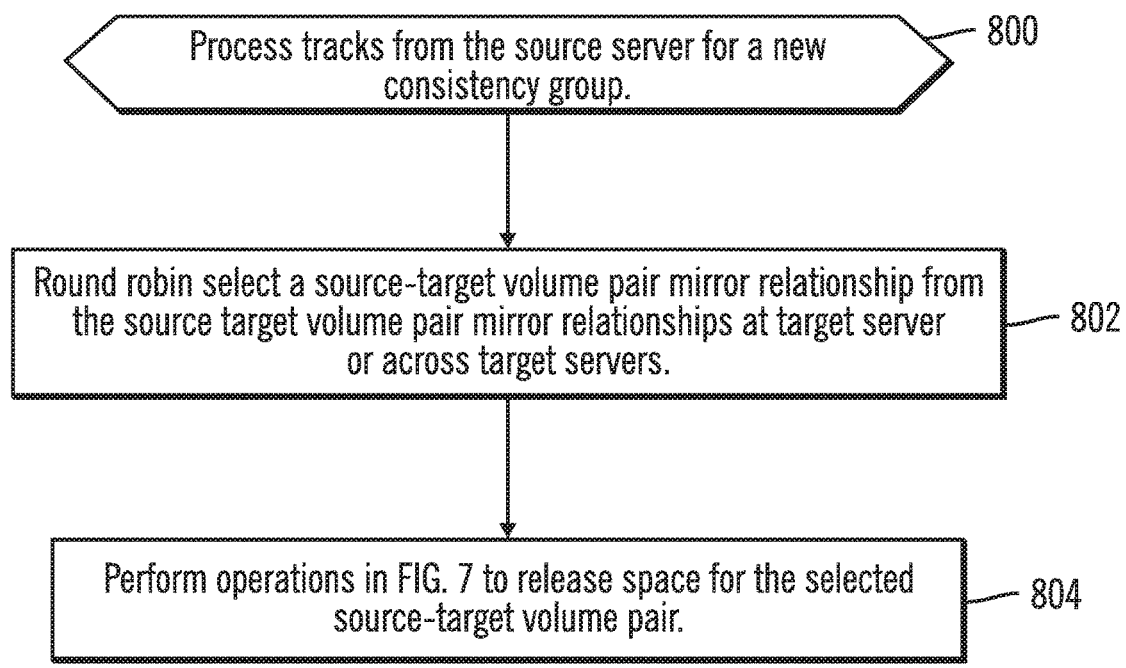
FIG. 8 illustrates an embodiment of operations to process tracks for a new consistency group.

FIG. 8 illustrates an embodiment of operations performed by the target copy manager 212₂ to release space for multiple target volumes in multiple source-target volume pairs identified in multiple mirror copy relationships $400_1 \ldots 400_n$ to maintain data in the target volumes $406_1 \ldots 406_n$ consistent as of the same consistency group time across source-target volume pairs. The source volumes $404_1 \ldots 404_n$ and the target volumes $406_1 \ldots 406_n$ in a consistency group may be stored in different source storage systems $100_1$ and different target storage systems $100_2$, respectively, or the multiple source and target volume pairs may be stored in the same source storage system $100_1$ and target storage system $100_2$. Upon the target copy manager $212_2$ processing (at block 800) tracks from the source server $200_1$ for multiple source volumes $104_1$ mirrored to multiple target volumes $104_2$ for a new consistency group, the target copy manager $212_2$ round robin selects (at block 802) a source-target volume pair mirror relationship $400_i$ from the source-target volume pair mirror relationships $400_1 \ldots 400_n$ at a target server $200_2$ or across target servers. For each consistency group being processed, the target copy manager $212_2$ selects at least one source-target volume pair, but less than all the source-target volume pair mirror relationships $400_1 \ldots 400_n$, to process for releasing space for the tracks from the selected at least one source-target volume pair. The target copy manager $212_2$ performs (at block 804) operations in FIG. 7 to release space for the selected source-target volume pair.

With the embodiments of FIG. 8, when there are multiple source-target volume pair mirror relationships $400_1 \ldots 400_n$, only one, or less than all, of the source-target volume pair mirror relationships $400_1 \ldots 400_n$ is selected for space release to minimize the impact on formation of a consistency group across multiple source-target volume pair mirror relationships $400_1 \ldots 400_n$, because the target copy manager $212_2$ is only delayed to release space for one of the source-target volume pairs before returning complete to the consistency group to the source servers for each of the source-target volume pair mirror relationships $400_1 \ldots 400_n$. Otherwise, the consistency group would not complete until space release operations completed for all the source-target volume pair mirror relationships $400_1 \ldots 400_n$. The embodiment of FIG. 8 allows for faster completion of complete to the create point-in-time copy command returned to the source server(s) for multiple source-target volume pair mirror relationships $400_1 \ldots 400_n$, because the space release operations of the described embodiments only need to complete for a selected one or limited number of source-target volume pairs in the consistency group.

Described embodiments provide optimizations to the computer technology for determining when to release space allocated to tracks in a target volume of a mirror copy relationships by determining space to release during the mirroring of the tracks in the source volume, and releasing space indicated in a volume table.

The reference characters used herein, such as i and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
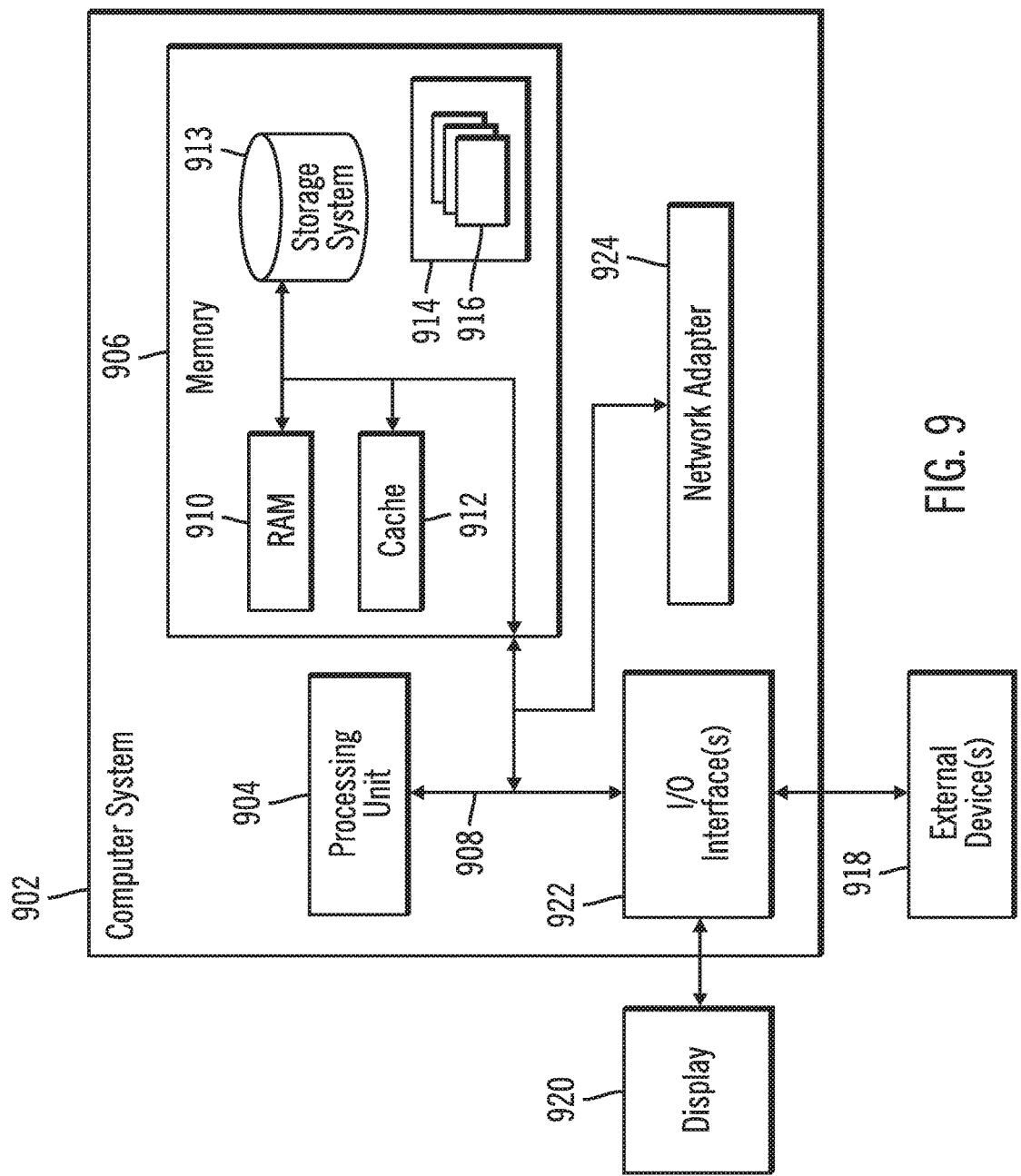
FIG. 9 illustrates a computing environment in which the components of FIG. 1 may be implemented.

The computational components of FIG. 1, including the servers $200_1$, $200_2$ may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for releasing space in a target volume to which data is copied from a source volume, wherein the computer program product comprises a computer readable storage medium having program instructions executable by a processor to cause operations, the operations comprising:

writing tracks received from the source volume to the target volume to form a consistency group of tracks in the source volume at the target volume;

determining tracks available to release from a volume table providing a state of the tracks in the target volume;

releasing space allocated to the determined tracks;

creating a point-in-time copy of the target volume; and returning complete to forming the consistency group in response to releasing the space and creating the point-in-time copy.

2. The computer program product of claim 1, wherein the releasing the space comprises:

forming a space release list indicating the determined tracks;

constructing space release commands for the tracks in the space release list; and sending the space release commands to a device adaptor to execute against the target volume to release the space, wherein the returning complete is performed in response to the device adaptor completing executing the space release commands and the creating the point-in-time copy of the target volume.

3. The computer program product of claim 1, wherein the operations further comprise:

receiving a message indicating that all tracks from the consistency group have been copied to the target volume, wherein the creating the point-in-time copy is performed in response to receiving the message.

4. The computer program product of claim 3, wherein the determining tracks available to release and releasing the space are performed in response to receiving the message, and wherein the creating the point-in-time copy is performed in response to releasing the space for the tracks available to release.

5. The computer program product of claim 3, wherein the message comprises a command to create a point-in-time copy.

6. The computer program product of claim 1, wherein there are a plurality of source-target volume pairs for which tracks from source volumes are copied to target volumes for the consistency group, wherein the operations of writing the tracks to the target volume, the determining tracks available to release, releasing the space, creating the point-in-time copy, and the returning complete to forming the consistency group are performed for each of the plurality of source-target volume pairs in the consistency group.

7. The computer program product of claim 6, wherein the determining the tracks available to release and releasing the space are performed for a selected source-target volume pair of the source-target volume pairs for the consistency group, wherein the operations further comprise:

alternating selecting a source-target volume pair from the source-target volume pairs across a plurality of consistency groups being formed at the source-target volume pairs; and performing the determining the tracks available to release and releasing the space for the selected source-target volume pair during the consistency groups being formed.

8. The computer program product of claim 7, wherein the alternating selecting a source-target volume pair comprises round-robin selecting a source-target volume pair over the consistency groups to release space for a subset of at least one selected source-target volume pair less than all of the plurality of source-target volume pairs during formation of each of the consistency groups.

9. The computer program product of claim 1, wherein the target volume comprises a thin provisioned volume, and wherein the space is released from the target volume to make available to other volumes configured in a target storage in which the target volume is configured.

10. A system for releasing space in a target volume to which data is copied from a source volume, comprising:
a processor; and
a computer readable storage medium having program instructions executable by the processor to cause operations, the operations comprising
writing tracks received from the source volume to the target volume to form a consistency group of tracks in the source volume at the target volume;
determining tracks available to release from a volume table providing a state of the tracks in the target volume;
releasing space allocated to the determined tracks;
creating a point-in-time copy of the target volume; and
returning complete to forming the consistency group in response to releasing the space and creating the point-in-time copy.

11. The system of claim 10, wherein the operations further comprise:
receiving a message indicating that all tracks from the consistency group have been copied to the target volume, wherein the creating the point-in-time copy is performed in response to receiving the message.

12. The system of claim 11, wherein the determining tracks available to release and releasing the space are performed in response to receiving the message, and wherein the creating the point-in-time copy is performed in response to releasing the space for the tracks available to release.

13. The system of claim 10, wherein there are a plurality of source-target volume pairs for which tracks from source volumes are copied to target volumes for the consistency group, wherein the operations of writing the tracks to the target volume, the determining tracks available to release, releasing the space, creating the point-in-time copy, and the returning complete to forming the consistency group are performed for each of the plurality of source-target volume pairs in the consistency group.

14. The system of claim 13, wherein the determining the tracks available to release and releasing the space are performed for a selected source-target volume pair of the source-target volume pairs for the consistency group, wherein the operations further comprise:
alternating selecting a source-target volume pair from the source-target volume pairs across a plurality of consistency groups being formed at the source-target volume pairs; and
performing the determining the tracks available to release and releasing the space for the selected source-target volume pair during the consistency groups being formed.

15. The system of claim 14, wherein the alternating selecting a source-target volume pair comprises round-robin selecting a source-target volume pair over the consistency groups to release space for a subset of at least one selected source-target volume pair less than all of the plurality of source-target volume pairs during formation of each of the consistency groups.

16. A method for releasing space in a target volume to which data is copied from a source volume, comprising:
writing tracks received from the source volume to the target volume to form a consistency group of tracks in the source volume at the target volume;
determining tracks available to release from a volume table providing a state of the tracks in the target volume;
releasing space allocated to the determined tracks;
creating a point-in-time copy of the target volume; and
returning complete to forming the consistency group in response to releasing the space and creating the point-in-time copy.

17. The method of claim 16, further comprising:
receiving a message indicating that all tracks from the consistency group have been copied to the target volume, wherein the creating the point-in-time copy is performed in response to receiving the message.

18. The method of claim 17, wherein the determining tracks available to release and releasing the space are performed in response to receiving the message, and wherein the creating the point-in-time copy is performed in response to releasing the space for the tracks available to release.

19. The method of claim 16, wherein there are a plurality of source-target volume pairs for which tracks from source volumes are copied to target volumes for the consistency group, wherein the writing the tracks to the target volume, the determining tracks available to release, releasing the space, creating the point-in-time copy, and the returning complete to forming the consistency group are performed for each of the plurality of source-target volume pairs in the consistency group.

20. The method of claim 19, wherein the determining the tracks available to release and releasing the space are performed for a selected source-target volume pair of the source-target volume pairs for the consistency group, further comprising:
alternating selecting a source-target volume pair from the source-target volume pairs across a plurality of consistency groups being formed at the source-target volume pairs; and
performing the determining the tracks available to release and releasing the space for the selected source-target volume pair during the consistency groups being formed.

21. The method of claim 20, wherein the alternating selecting a source-target volume pair comprises round-robin selecting a source-target volume pair over the consistency groups to release space for a subset of at least one selected source-target volume pair less than all of the plurality of source-target volume pairs during formation of each of the consistency groups.

* * * * *